United States Patent
Bright et al.

[11] Patent Number: 5,981,059
[45] Date of Patent: Nov. 9, 1999

[54] MULTI-LAYER TOPCOAT FOR AN OPTICAL MEMBER

[75] Inventors: Clark I. Bright, El Granada; Julius G. Kozak, Antioch, both of Calif.

[73] Assignee: Southwall Technologies, Inc., Palo Alto, Calif.

[21] Appl. No.: 09/012,150

[22] Filed: Jan. 22, 1998

Related U.S. Application Data

[63] Continuation-in-part of application No. 08/417,058, Apr. 3, 1995, Pat. No. 5,744,227.

[51] Int. Cl.$^6$ ............................... B32B 27/00; B32B 9/04
[52] U.S. Cl. ......................... 428/336; 428/421; 428/422; 428/429; 428/447; 428/448
[58] Field of Search .................................. 428/421, 422, 428/428, 429, 446, 447, 448, 336

[56] References Cited

U.S. PATENT DOCUMENTS

| | | | |
|---|---|---|---|
| 3,900,673 | 8/1975 | Mattimoe et al. | 428/339 |
| 4,338,376 | 7/1982 | Kritzler | 428/417 |
| 4,654,235 | 3/1987 | Effenberger et al. | 427/407.3 |
| 4,961,996 | 10/1990 | Carre et al. | 428/421 |
| 4,996,125 | 2/1991 | Sakaguchi et al. | 430/66 |
| 5,037,701 | 8/1991 | Carre et al. | 428/420 |
| 5,139,879 | 8/1992 | Aharoni et al. | 428/422 |
| 5,170,291 | 12/1992 | Szczyrbowski et al. | 359/580 |
| 5,281,893 | 1/1994 | Matsuda et al. | 313/478 |
| 5,321,083 | 6/1994 | Hanada et al. | 525/102 |
| 5,392,156 | 2/1995 | Kumagai et al. | 359/586 |
| 5,476,717 | 12/1995 | Floch | 428/421 |
| 5,478,652 | 12/1995 | Grootaert et al. | 428/422 |
| 5,500,042 | 3/1996 | Grootaert et al. | 106/287.11 |

OTHER PUBLICATIONS

3M Product Information Sheet, "3M Fluorad™ Fluorochemical Coating FC–722," Apr., 1994.

*Primary Examiner*—Hoa T. Le
*Attorney, Agent, or Firm*—Law Offices of Terry McHugh

[57] ABSTRACT

An optical arrangement includes a transmissive or reflective substrate having a first surface on which a multi-layer antireflection stack is formed. The antireflection stack is protected by a fluorocarbon lubricating layer that reduces the surface energy of the exposed surface to less than 40 dynes/cm, and preferably less than 20 dynes/cm. The fluorocarbon lubricating layer and a silane adhesion promotion layer form a durable topcoat having desired mechanical and optical characteristics. The preferred material for forming the lubricating layer is a fluoropolymer sold by 3M Company under the federally registered trademark FLUORAD.

20 Claims, 2 Drawing Sheets

MULTI-LAYER TOPCOAT FOR AN OPTICAL MEMBER

CROSS REFERENCE TO RELATED PATENT APPLICATION

This application is a continuation-in-part of U.S. patent application Ser. No. 08/417,058, filed Apr. 3, 1995 now U.S. Pat. No. 5,744,227.

TECHNICAL FIELD

The invention relates generally to the treatment of light transparent members, such as display screens and reflective members, and relates more particularly to protecting coatings that are applied to an optical member to maintain desired optical properties.

BACKGROUND ART

Coatings are applied to light transmissive or reflective members in order to impart desired optical properties to the members. For example, one or more coatings may be applied to a screen of a computer monitor in order to provide polarization or to reduce reflection. A cathode ray tube (CRT) may be surface coated with an antireflection layer having an optical thickness of approximately one-quarter of the center wavelength of light that is to be reflected. The antireflective coating may be an organic material, such as a polymer, or an inorganic material, such as a metal fluoride, metal oxide, or metal nitride. Often, the antireflective coating is a multi-layer stack.

Obtaining the desired optical properties is not isolated from other concerns. Coating a light transmissive member should not render the coated surface susceptible to chemical or mechanical damage. One approach to providing a coating having the required properties is to select a single material for forming a layer that reaches acceptable levels of antireflectivity, mechanical strength and chemical resistance. U.S. Pat. No. 5,281,893 to Matsuda et al. describes an optical film for application to a display screen of a CRT or liquid crystal display (LCD). The optical film is described as having a reduced external light reflection, a high mechanical strength and an increased resistance to damage caused by humidity. While the single-layer approach provides advantages with respect to ease of fabrication, this approach necessarily requires that tradeoffs be made among the various properties.

The more common approach is to utilize a multi-layer assembly. U.S. Pat. No. 5,170,291 to Szczyrbowski et al. describes a four-layer system having alternately high and low refractive indices in order to achieve a high antireflection effect. However, the exposed outermost layer remains susceptible to damage caused by contact with an object or a chemical. Ideally, the outermost layer is resistant to attack by common cleaners and solvents, is scratch-resistant, is not stained by water or oils, and allows easy removal of dust and other particulate matter. At the same time, the layer should not adversely affect the optical properties of the coated assembly.

U.S. Pat. No. 5,476,717 to Floch describes a multi-layer assembly for a transparent substrate. An adhesion promotion layer formed of a material selected from silanes is formed on the substrate. An antireflection coating formed from colloids of silica in a polysiloxane binder is then formed on the adhesion promoter layer. Then, a coupling agent layer of a material selected from silazanes is applied. Finally, an anti-abrasion layer of a fluorinated polymer is formed to reduce the mechanical vulnerability of the assembly. The anti-abrasion layer identified in the patent is a derivative of polytetrafluoroethylene (PTFE), which is sold under the federally registered trademark TEFLON AF and marketed by duPont de Nemours. While the anti-abrasion layer provides a number of advantages over prior art assemblies, one disadvantage is that the TEFLON AF on the silazane material must be raised to a relatively high temperature. The Floch patent identifies a final heating stage at a temperature between 110° and 120° C. in order to evaporate the residue solvent. Another disadvantage is that the coating may be relatively easily damaged by normal use, for example, in computer display applications.

A parameter that is used to characterize properties of a surface is contact angle, i.e., the angle formed between the plane of the surface and the tangent to a droplet on the surface. The measure of the contact angle is an indication of surface energy and may be used to characterize the wetability, oil resistance (e.g., anti-smudge) and the lubricating effects of a coating on a substrate.

What is needed is a light transmissive assembly in which tradeoffs between optical and mechanical properties are minimal and a protective layer is formed as the outermost layer in a cost efficient manner that does not jeopardize the structural integrity of previously formed layers. More specifically, what is needed is a topcoat that has a high contact angle, that maintains a high contact angle after rubbing, and that is formed at a sufficiently low temperature to not jeopardize either a substrate or an intermediate layer between the substrate and the topcoat.

SUMMARY OF THE INVENTION

An optical assembly includes a topcoat that is a combination of a silane and a fluorocarbon on a silicon-containing and/or an oxygen-containing substrate or optical layer stack. That is, the silane is used as a bonding material for the fluorocarbon. While a silane layer has been used for bonding two silicon-containing and/or oxygen-containing layers, a topcoat of a fluorocarbon and a silane previously has not been shown as providing desirable characteristics with respect to contact angle, resistivity to water and oil, durability, and surface energy.

While not critical, one embodiment applies the silane-fluorocarbon topcoat to an antireflection stack that includes alternating layers of high and low refraction indices. An adhesion-promotion layer of a silane material is then formed on the antireflection stack. The silane layer promotes chemical bonding of the outermost silicon dioxide layer of the antireflection stack to the fluorocarbon, which acts as a lubricating layer.

In another embodiment, the silane adhesion promotion layer and the fluorocarbon lubricating layer are formed directly on a substrate that is selected for its optical properties. For example, the substrate may be a transparent polymer or glass. Alternatively, the substrate may be a reflective member. It is also contemplated to form the topcoat as a single layer by blending the silane and fluorocarbon.

The silane-fluorocarbon topcoat may be sufficiently thin so as not to significantly affect the optical properties of the assembly to which the topcoat provides its desired mechanical properties. By selecting the proper fluorocarbon, the lubricating layer may be applied at a thickness of 200 angstroms or less. In many applications, the effect of the topcoat on the optical performance of the underlying assembly may be further reduced by reducing the thickness of the outermost layer of the assembly by approximately the thickness of the topcoat. For example, in the antireflection stack, the outermost layer in the alternating pattern of high and low refractive index layers may be reduced in thickness by the thickness of the silane-fluorocarbon topcoat.

While other silanes may be employed, a preferred silane is a preparation of 0.125% by weight of N-(2-amino ethyl)-3-aminopropyltrimethoxysilane in isopropyl alcohol (2 propanol). A preferred fluorocarbon for the lubricating layer is a material sold by 3M Company under the federally registered trademark FLUORAD, and is most preferably FLUORAD FC-722. This material is sold diluted to a 2% solution in a fluorinated solvent. The FLUORAD FC-722 layer is not susceptible to attack by commonly available cleaners and solvents. Moreover, the resulting topcoat has a low visibility of fingerprints and the like. That is, the topcoat has a high contact angle that exhibits anti-smudge characteristics. The lubricating layer imparts a low surface energy of less than 40 dynes/cm, and preferably exhibits a surface energy of less than 20 dynes/cm. An alternative fluorocarbon is the tetrafluoroethylene derivative or copolymer sold by Dupont under the federally registered trademark TEFLON AF.

A preferred method of utilizing the silane-fluorocarbon topcoat is to sequentially apply an optical coating (e.g., antireflection stack), the silane adhesion promotion layer and the fluorocarbon lubricating layer to a hardcoat flexible web, such as a plastic film of polyethylene terphthalate (PET). The web can then be segmented and laminated to computer monitors, other display screens, or other devices in which an antireflective, scratch resistant structure is beneficial, such as silver reflectors. Pressure-sensitive adhesive, ultraviolet or thermally curable resins, or electrostatic forces may be used to secure a segment of the web to the surface that is to be laminated. Alternatively, the layers may be formed directly on such structures. However, the topcoat may be used in applications other than providing lubrication to an antireflection stack.

An advantage of the invention is that the silane provides a durable bond of the fluorocarbon to a silicon-containing and/or oxygen-containing material. Another advantage is that the silane layer provides a pristine surface that is easily wetted and covered by the fluorocarbon, and hence attaining a high contact angle at an extremely low thickness. For example, in the antireflection stack, the top layer to which the topcoat is applied may be silicon dioxide. By utilizing the silane-fluorocarbon combination, the topcoat is resistant to removal by, for example, rubbing the surface of the topcoat with or without a fluid, e.g., acetone. Another advantage is that the topcoat is hydrophobic and oleophobic. Moreover, the topcoat has a low surface energy and a high contact angle, i.e., the topcoat exhibits anti-smudge characteristics.

BEST MODE FOR CARRYING OUT THE INVENTION

Figure 1:
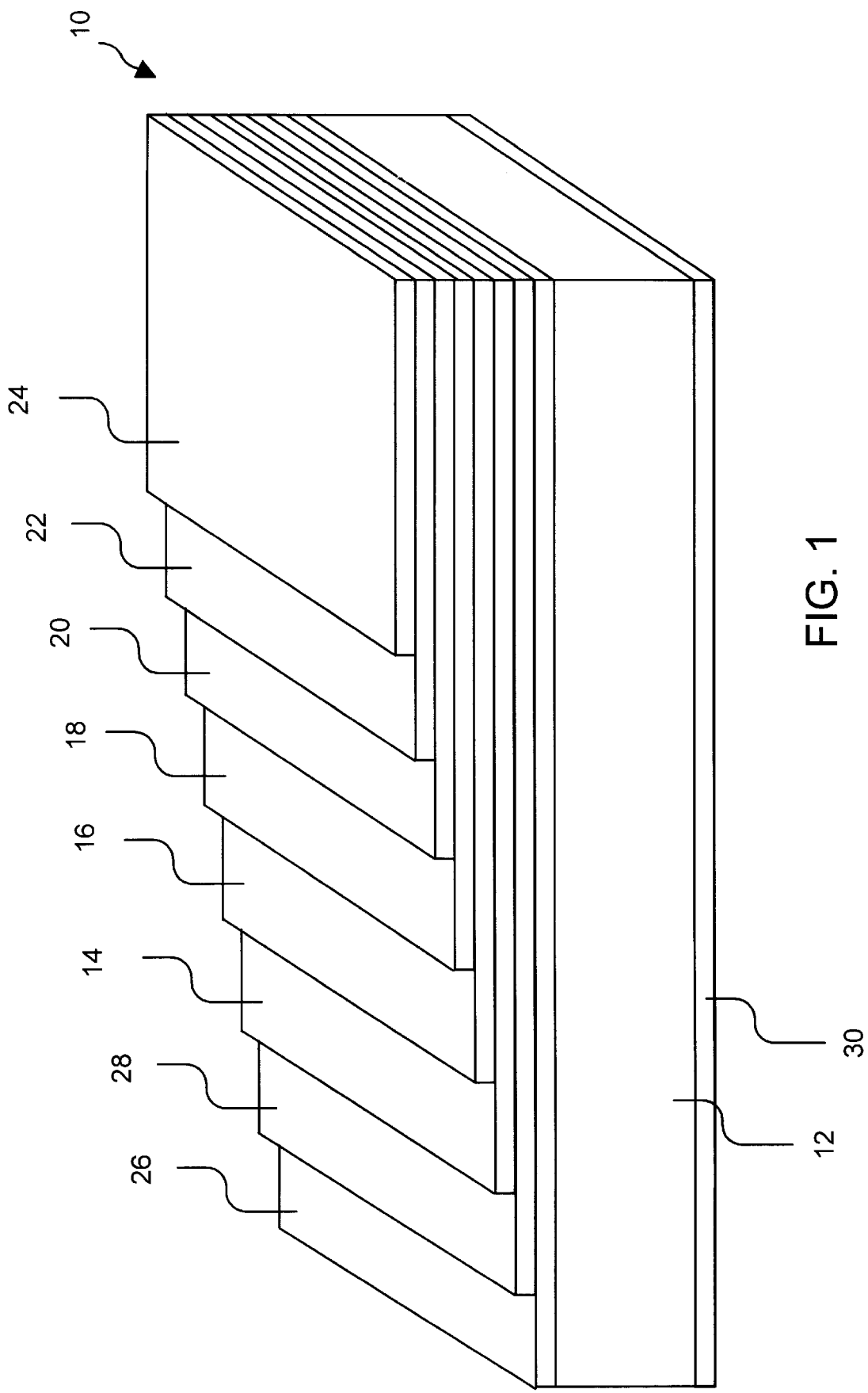
FIG. 1 is a perspective view of one embodiment of a light transmissive assembly having a lubricating layer in accordance with the invention.

FIG. 1 illustrates one embodiment of an optical arrangement that includes a silane-fluorocarbon topcoat that is hydrophobic and oleophobic and that exhibits a low surface energy and a high contact angle (i.e., anti-smudge). In the illustrated embodiment, the optical arrangement is transparent and the topcoat is applied to an intermediate layer. However, the topcoat may also be used with a reflective arrangement and/or may be applied directly to a substrate.

With reference to FIG. 1, a light transmissive member 10 is shown as including a light transmissive substrate 12. In one embodiment, the substrate is formed of polyethylene terphthalate (PET). The substrate material is not critical to the invention, but in the preferred embodiment, antireflection and topcoat layers that will be described below are applied in web form, so that the substrate must be flexible. The flexible substrate and the various layers can then be attached to another substrate, such as a display screen of a computer monitor. On the other hand, the antireflection and topcoat layers may be applied directly to the final product. Thus, the substrate may be an organic or inorganic material.

Without the antireflection layers 14, 16, 18 and 20, the substrate 12 might exhibit a reflection level in the range of 5% to 20% over the visual wavelengths. For example, PET reflects from 10% to 15% of visible light (two-sided reflection). The antireflection stack formed by the layers 14–20 is designed to significantly reduce the reflection level. Atop the antireflection stack is an adhesion promotion layer 22 of a silane material. The uppermost layer is a lubricating layer 24 of a fluorocarbon with a low surface energy and with anti-friction properties to facilitate cleaning and scratch resistance. The lubricating layer 24 is preferably a material sold by 3M Company under the federally registered trademark FLUORAD. In the most preferred embodiment, the material is FLUORAD FC-722, which is sold diluted to a 2% solution in a fluorinated solvent. In comparison, FLUORAD-724 is sold diluted to a 0.2% solution in the same solvent.

Also in the preferred embodiment, the silane that is used as the adhesion promotion layer 22 is N-(2-amino ethyl)-3-amino-propyltrimethoxysilane in isopropyl alcohol (2-propanol). This silane is commercially available, for example, from Dow Chemical Corporation as Z-6020. However, other silanes have been tested and have exhibited acceptable results with respect to ensuring that the lubricating layer 24 of the topcoat is durably bonded to an underlying material having silicon and/or oxygen. In FIG. 1, the underlying layer is a layer 20 of silicon dioxide. The use of a silane to form a bonding layer between two silicon-containing materials is known (see U.S. Pat. No. 5,476,717 to Floch), however, the use of a silane to bond a fluorocarbon in an optically active arrangement is considered to be novel. Silanes that have been tested include 3-amino propyltriethoxysilane (Union Carbide A-1100), 3-methacryloxy propyltrimethoxysilane (Dow Corning Z-6030), N-(2-(vinylbenzylamino)-ethyl)-3-amino propyltrimethoxysilane (Dow Corning Z-6032), 3-glycidoxypropyltrimethoxysilane (Dow Corning Z-6040), vinyl triacetoxy silane (Dow Corning Z-6075), vinylmethyidimethoxysilane OSI specialties (A-2171), gammaaminopropyltrimethoxysilane (A-1110), modified aminoorganosilane (A-1126), modified aminosilane (A-1128), triaminofunctional silane and N-beta (aminoethyl)-gamma-aminopropylmethydimethoxysilane (A-2120).

There are also alternative fluorocarbons for forming the lubricating layer 24. The material sold by Dupont under the federally registered trademark TEFLON AF provides desirable mechanical and optical characteristics. TEFLON AF is a family of amorphous copolymers of perfluoro (2,2-dimethyl-1,3-dioxide) (PDD) and tetrafluoroethylene (TFE).

While TEFLON AF may be used to form a layer having properties that are comparable to a lubricating layer of FLUORAD FC-722, the FLUORAD FC-722 is preferred since it can be applied at a lower temperature. Other known fluorocarbons may be used to provide desirable properties for the lubricating layer, such as ZDOL, which is a Z-derivative of the fluorinated chemical product sold by Ausimont (Italy) under the federally registered trademark FOMBLIN. For example, if a specific application requires a high resistivity to writing by means of a felt-tin pen or the like, ZDOL may be preferred. On the other hand, if a high contact angle is a more important consideration than felt-tip writing, FLUORAD FC-722 and TEFLON AF provide superior results.

In the embodiment of FIG. 1, a hardcoat layer 26 is formed on the substrate 12. The hardcoat layer improves the durability of the flexible substrate during processing and during use of the end product. Hardcoat layers are known in the art. The hardcoat layer 26 can be any one of known materials, such as silica-based hardcoats, siloxane hardcoats, melamine hardcoats, acrylic hardcoats and the like. Such materials typically have refractive indices of 1.40 to 1.60. Thus, the refractive indices are typically lower than the index of the substrate 12. An acceptable thickness range is from 1 $\mu$m to 20 $\mu$m. The hardcoat layer is not critical to the invention.

In some applications of the invention, it is advantageous to include a thin primer layer 28 to improve adhesion of the optical layers to the hardcoat layer 26. The primer layer may be a metal that undergoes conversion, i.e. oxidation, in situ during processing, so as to yield a substantially transparent, substantially colorless inorganic material, such as a metal oxide. Examples of useful primer materials include silicon, titanium, chromium, nickel and alloys such as nickel chromium. The primer layer 28 should be sufficiently thin to minimize disruption of the desired optical properties of the light transmissive member 10. Preferably, the primer layer has a thickness of less than 30 angstroms. Like the hardcoat layer 26, the primer layer is not critical to the invention. The first and third antireflection layers 14 and 18 may be sputter-deposited inorganic material having an index of refraction of 1.7 to 2.6, and preferably 1.8 to 2.3, and especially 1.88 to 2.15. These layers are referred to as "high index layers" relative to the second and fourth antireflection layers 16 and 20.

The antireflection stack may be an absorbing antireflection stack or may provide uniform transmissivity. Preferably, the first and third antireflection layers 14 and 18 are characterized as being "substantially transparent" or "light transmissive." These terms are defined to mean that the material is substantially transmitting in the visible region, with a total integrated absorption over this range of less than approximately 50% and preferably from 0% to 25% at the layer thickness typically employed. Acceptable metals for forming the first and third antireflection layers are typically substantially colorless when present in combination with the low index second and fourth antireflection layers 16 and 20. The term "substantially colorless" is defined to mean that the absorption curve for the material is devoid of significant absorption peaks in the visible range, and does not present a distinct tint or hue in reflected to transmitted light when viewed under typical sunlight conditions.

Preferably, the first and third antireflection layers 14 and 18 each have a substantial degree of electrical conductivity. For example, the sheet resistivity may be below approximately $1 \times 10^6$ ohms per square. This can be achieved by forming the layers from a metal oxide that is oxygen deficient and thereby inherently conductive. Examples of such materials are oxides of tin, indium, zinc, tungsten and cadmium and oxides of alloys of these materials, such as indium-tin oxide. In addition, conductivity can be imparted to inorganic material by doping the materials with metallic elements. However, indium-tin oxide mixtures provide desirable results and are preferred. The thickness of the first and third antireflection layers is in the range of 50 to 3,000 angstroms, and is preferably in the range of 150 to approximately 1200 angstroms.

The second and fourth antireflection layers 16 and 20 each have a refractive index in the range of 1.25 to 1.7, and preferably in the range of 1.4 to 1.6. These layers may be referred to as "low index layers" of the layer pairs that provide the antireflection capability. Each of the layers is substantially transparent and substantially colorless when present in combination with its high index layer of the pair. Examples of the classes of compounds that provide suitable materials for forming the low index layers are certain inorganic oxides, metal fluorides, and metal oxyfluorides. For sputtering, the preferred material is silicon dioxide, but other materials may be used. Each of the low index layers has a thickness that is substantially equal to the thickness range of the high index layers.

Optionally, the thickness of the outermost low index layer 20 can be reduced by the thickness of the topcoat, i.e., the combined thickness of the silane adhesion promotion layer 22 and the fluorocarbon lubricating layer 24. This reduces the potential effects of the topcoat on the optical properties of the arrangement. More accurately, it is the optical thickness (i.e., the product of the refractive index and the metric thickness of the layer) for which there is compensation.

While not critical, the four antireflection layers 14–20 may be applied using sputtering techniques. For example, the layers may be sputter deposited in multi-cathode vacuum systems with web widths of up to two meters and web lengths of several thousand meters. While the embodiment of FIG. 1 shows two pairs of high/low index layers, the number of pairs is not critical.

As previously noted, the adhesion promotion layer 22 is formed between the lubricating layer 24 and the uppermost antireflection layer 20. The two-layer topcoat formed by layers 22 and 24 improves the chemical bond of the fluorocarbon material of the lubricating layer to the remainder of the light transmissive member 10. The adhesion promotion layer is a silane. Silanes are known in the art and are sometimes used as coupling agents to bond silicon-containing antireflection layers to glass substrates (silicon-containing). However, the use of the silane layer 22 in FIG. 1 is to promote chemical bonding of the fluorocarbon. Such a topcoat has all of the features of a single thick fluorocarbon layer and has a higher contact angle than a thin layer alone. In addition, it improves the retention of the desirable optical and chemical properties after several rubbings or cleanings with acetone or other solvents. Laboratory samples were demonstrated as retaining the desired properties after at least 50 cycles (100 strokes) with a 2224 g/cm$^2$ force on an acetone-soaked pad of laboratory wiping cloth.

The lubricating layer 24 is preferably less than 200 angstroms thick, and is optically inactive. The layer may be as thin as an average of 2 angstroms. The layer is formed of a material having an inherent surface energy of less than 20 dynes/cm. The oleophobic-hydrophobic fluorochemical polymer sold by 3M Company under the federally registered trademark FLUORAD FC-722 has a bulk surface energy of 11–12 dynes/cm. The index of refraction is approximately 1.36.

The lubricating layer 24 may be formed separately from the sputtering apparatus used to form the antireflection layers 14–20, but this is not critical. The layer can be applied by diluting the fluorocarbon in a fluorinated solvent. For example, FLUORAD FC-722 may be diluted to a 0.005%–1% solution of fluorocarbon in the solvent sold by 3M Company under the federally registered trademark FLUORINERT FC-72. Diluting the fluoropolymer to a 0.0125% solution provides a cost efficient means of lubricating the light transmissive member 10.

After the diluted fluorocarbon has been applied to the top layer of the light transmissive member 10, the assembly is dried to evaporate the solvent. Performance superiority is achieved at relatively low oven temperatures, since the boiling point of the solvent is low.

With the adhesion promotion layer 22 and the lubricating layer 24, the light transmissive member 10 failed a scratch test of a mechanical pencil without lead, applied at 45°, and tested after rubbing with an acetone-soaked pad (50 cycles/ 2224 g/cm$^2$), only when loaded up to 450 grams. Without either layer 22 or layer 24 applied, the antireflection stack formed by layers 14–20 was significantly scratched even when the load was reduced to 25 grams, either before or after rubbing with the loaded acetone-soaked pad. However, with the addition of only the lubricating layer 24, the light transmissive member 10 passed the mechanical pencil scratch test before rubbing, but failed with a load of 50 grams, after rubbing for only 10 cycles with a 358 g/cm$^2$ loaded acetone-soaked pad. The material used to form the adhesion promotion layer 22 was the silane sold by Dow Corning as Z-6020.

Figure 2:
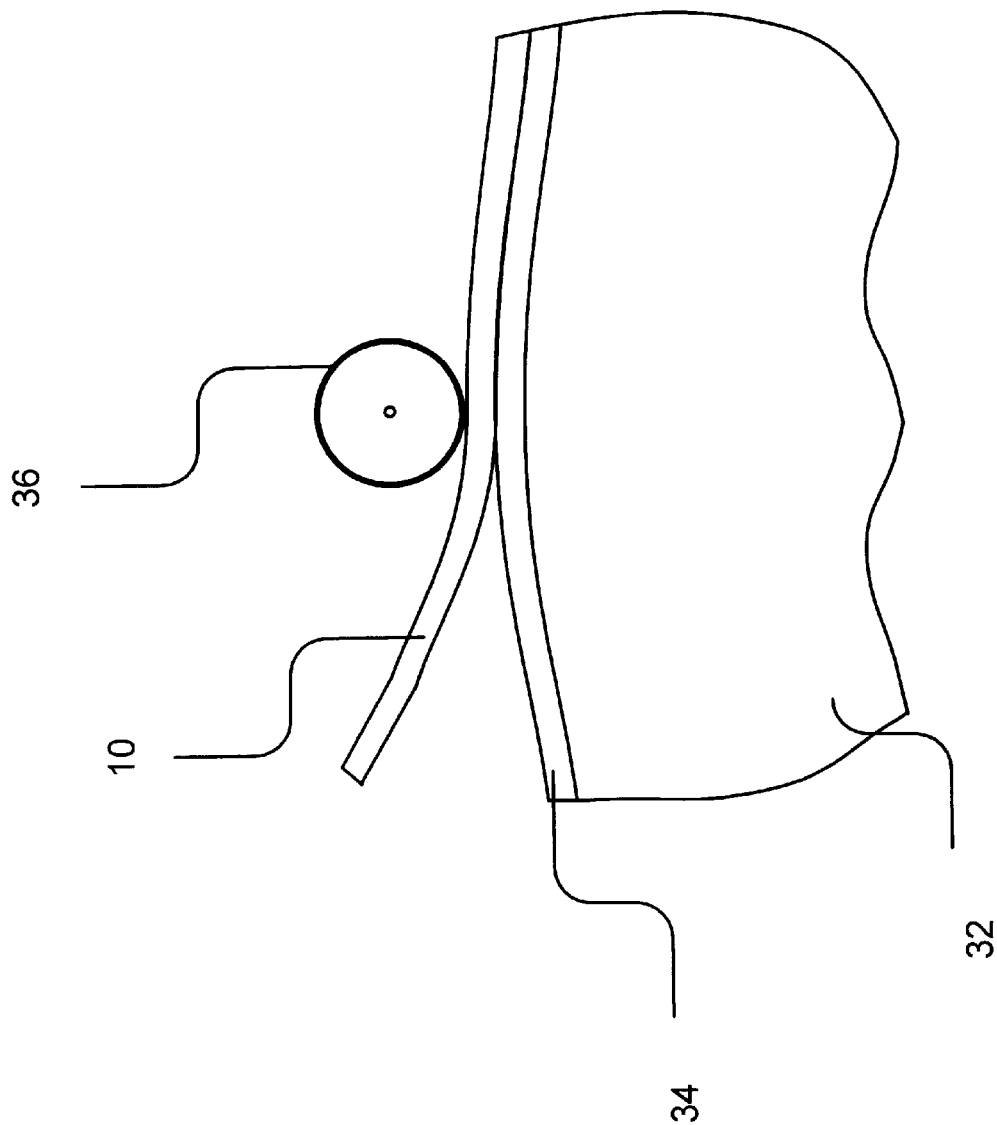
FIG. 2 is a schematic view of one embodiment for applying the light transmissive assembly of FIG. 1 to an optical device, such as a display screen.

On the under side of the substrate 12 is a pressure-sensitive adhesion primer 30 that is used in attaching the light transmissive member 10 to another surface. Alternatively, the substrate may be attached to the surface by electrostatic force. Referring now to FIG. 2, the light transmissive member 10 may be delivered in roll form at pre-slit widths. A sheet of the roll is shown as being laminated to a cathode ray tube (CRT) 32. Optionally, an ultraviolet-curable adhesive film 34 may be formed on the CRT. A roller 36 is used to apply the required load force to attach the light transmissive member 10 to the CRT 32. Because of the singular radius of curvature of certain CRTs, direct lamination of the member is easily accomplished. If the CRT is one that includes compound radii of curvature, the light transmissive member may be thermoformed prior to lamination. Thermoforming techniques are known in the art.

While the light transmissive member of FIG. 1 has been described as being preformed for separate application to a CRT or other light transmissive device, this is not critical. Optionally, the antireflection stack and the lubricating layer may be formed directly onto a display screen, such as a CRT or LCD (liquid crystal display). The invention may also be used with devices other than display screens. For example, the antireflection stack, the adhesion promotion layer and the lubricating layer may be applied to a silver mirror of the type used in backlighting and projection television. Moreover, the silane-fluorocarbon topcoat may be applied to optical arrangements that do not include layers that are used to inhibit reflection. As another example, the adhesion promotion and lubricating layers may be applied directly to a transmissive or reflective substrate.

EXAMPLES

In a first example, a silane solution was prepared of 0.125% by weight of N-(2-amino ethyl)-3-amino propyltri-methoxysilane in isopropyl alcohol (2-propanol). A fluorocarbon solution was prepared by diluting a 2% by weight solution of the fluoropolymer FLUORAD FC-722, with the pre-fluorinated solvent FC-72 to a solution of 0.0125% by weight.

The silane solution was applied by spin coating for one minute at 3000 rpm onto a four-layer antireflection coating that was sputter deposited on a PET substrate. The material of the outer layer on which the silane solution was applied was silicon dioxide. The multi-layer antireflection coating sample was dried in a convection oven preheated to 77° C. for five minutes. After cooling to room temperature, the antireflection coated sample was spin coated for one minute at 3000 rpm with the fluorocarbon solution on top of the film formed from the silane solution. The sample was again placed in a convection oven preheated to 77° C. for five minutes. After cooling to room temperature, the sample was measured and determined to have a contact angle with distilled water of 114°. The determination of contact angle is a well established method for determining the wetability of a surface. The contact angle of the silicon dioxide before it was coated with the silane solution and the fluorocarbon solution was approximately 24°.

The durability of the sample with the two-layer topcoat was tested by determining the resistance to scratching with a mechanical pencil tip, without lead, loaded with various weights. In addition, the sample was tested by rubbing the lubricating layer for thirty cycles (i.e., sixty strokes) with #0000 steel wool loaded with 200 gm/cm$^2$. The durability was further tested by rubbing with an acetone-soaked pad, loaded with 2.2 kg/cm$^2$, for fifty cycles (i.e., one hundred strokes). No visible damage to the coating was detected after any of the tests. In addition, the coating was subjected to temperatures cycling from −20° C. to +71° C. and was humidity tested at 95% relative humidity and 50° C. for forty-eight hours. Again, no visible damage was detected.

Other specific examples of a combination of a silane and a fluorocarbon include: (1) A1120 and TEFLON AF, and (2) A1120 and ZDOL.

As previously noted, the selection of the fluorocarbon for forming the topcoat may be based upon the intended application. For example, in the antireflection stack described with reference to FIG. 1, the fluorocarbon may be selected to maximize the contact angle. However, this may require a tradeoff with regard to providing a lubricating layer that is resistant to ink from a pen or with regard to providing a surface that is easily cleaned. The tradeoff may be reduced by providing a "blend" or mixture of fluorocarbon materials that are selected for imparting particular surface properties when applied to a substrate or a layer on a substrate.

The two-layer protective/anti-smudge topcoat that is formed by the combination of the silane adhesion promotion layer 22 and the fluorocarbon lubricating layer 24 of FIG. 1 has been shown to provide the durability required for survival during commercial use of a CRT or the like. While the topcoat described in U.S. Pat. No. 5,476,717 to Floch provided an improvement over the prior systems, the topcoat has been shown to be less durable than the one described with reference to FIG. 1. For purposes of testing, the two topcoats were applied to identical samples of a four-layer sputtered anti-reflection coating. The two-layer coating as taught by Floch was prepared as described in Example 1 and 2, steps 5 and 6 of the patent, except that the more environmentally safe, preferred solvent anhydrous 1-butanol was used in lieu of tetrahydrofuran in step 5. The two layers of Floch were applied as described in step 7 of the patent, i.e., spin coated at 1800 rpm for thirty seconds and dried at 120° C. for thirty minutes. Both of the samples of protected antireflection optical arrangements were tested for resistance to steel wool, acetone rub, and mechanical pencil scratching. The mechanical pencil test was applied both before and after the acetone rub test. The repeat of the mechanical pencil scratch test was used to indicate the ability of the topcoat to retain a useful thickness of fluoropolymer after rubbing.

The topcoat of Floch failed the acetone rub test at the minimum settings of ten cycles (i.e., twenty strokes) and 358 g/cm² loading, while the silane/fluorocarbon topcoat of the above-described invention passed the test after fifty cycles (one hundred strokes) with 2224 g/cm², and then passed the mechanical pencil scratch test in the rubbed area with loads of up to 500 grams. Prior to the acetone rub, the Floch topcoat passed the mechanical pencil scratch test at 600 grams. In comparison, the silane/fluorocarbon topcoat passed the mechanical pencil scratch test at 650 grams. Regarding contact angle of distilled water, the Floch topcoat exhibited contact angles of 120° and 5° before and after the acetone rubbing, respectively. On the other hand, the silane/fluorocarbon topcoat was measured to have a contact angle of 114° prior to the acetone rub and 90° following the acetone rub, thus indicating that most of the silane/fluorocarbon topcoat was retained after rubbing.

What is claimed is:

1. An optical arrangement comprising:
   an optical substrate having opposed first and second sides; and
   a multi-layer topcoat on at least one of said first and second sides, said topcoat being substantially transparent, said topcoat including:
   an adhesion promotion layer formed of a silane; and
   a lubricating layer formed of at least one fluorocarbon material, said lubricating layer contacting a surface of said adhesion promotion layer opposite to said substrate.

2. The optical arrangement of claim 1 further comprising an intermediate layer between said substrate and said topcoat, said intermediate layer being formed of a material containing at least one of silicon and oxygen, said adhesion promotion layer being in contact with said intermediate layer.

3. The optical arrangement of claim 2 further comprising a multi-layer antireflection stack in which adjacent layers have refractive indices selected to retard reflection, said stack including said intermediate layer, said substrate being optically transparent.

4. The optical arrangement of claim 3 wherein other than said intermediate layer, layers in said antireflection stack have generally equal optical thicknesses, said topcoat and said intermediate layer having a combined optical thickness that is generally equal to said optical thicknesses of said other layers in said antireflection stack.

5. The optical arrangement of claim 1 wherein said substrate is a display screen of a monitor.

6. The optical arrangement of claim 1 wherein said lubricating layer is formed of a material sold by 3M Company under the federally registered trademark FLUORAD.

7. The optical arrangement of claim 1 wherein said lubricating layer is formed of a material sold by duPont de Nemours under the federally registered trademark TEFLON AF.

8. The optical arrangement of claim 1 wherein said adhesion promotion layer is formed from N-(2-amino ethyl)-3-amino-propyltrimethoxysilane.

9. The optical arrangement of claim 1 wherein said lubricating layer has a thickness of less than 200 angstroms and a surface energy of less than 40 dynes/centimeter.

10. A method of lubricating an optical arrangement comprising steps of:
    providing a light transmissive member having an upper surface of a material containing at least one of oxygen and silicon; and
    forming a topcoat on said upper surface, including selecting and applying a silane bonding agent and at least one fluorocarbon lubricant such that said topcoat is generally optically inactive and such that said silane bonding agent and said at least one fluorocarbon lubricant are in contact with each other.

11. The method of claim 10 wherein said step of forming said topcoat includes separately applying said silane bonding agent and said at least one fluorocarbon lubricant in separate layers to form a two-layer topcoat, said layer of silane bonding agent being applied to said upper surface of said light transmissive member.

12. The method of claim 10 wherein said step of forming said topcoat includes mixing said silane bonding agent and said at least one fluorocarbon prior to applying said topcoat to said upper surface.

13. The method of claim 10 wherein said step of providing said light transmissive member includes forming an antireflection stack of layers having alternating refractive indices, said surface on which said topcoat is formed being a layer of said antireflection stack.

14. The method of claim 10 further comprising a step of applying said light transmissive member to a cathode ray tube (CRT).

15. The method of claim 10 wherein said step of selecting said at least one fluorocarbon comprises selecting one of FLUORAD and TEFLON AF.

16. A lamination on a display screen comprising:
    an antireflection coating having a plurality of layers, including an outermost layer of a material having at least one of silicon and oxygen;
    a silane adhesion promotion layer on said outermost layer; and
    a fluorocarbon lubricating layer on said silane adhesion promotion layer, said adhesion promotion and lubricating layers forming an optically passive topcoat.

17. The lamination of claim 16 further comprising a substrate on a side of said antireflection coating opposite to said topcoat, said substrate being fixed to said display screen using one of a pressure-sensitive adhesive, a curable adhesive or electrostatic force.

18. The lamination of claim 16 wherein said fluorocarbon lubricating layer is formed of FLUORAD.

19. The lamination of claim 16 wherein a combined thickness of said outermost layer and said topcoat is generally equal to a thickness of each layer in said antireflection coating other than said outermost layer.

20. The lamination of claim 16 wherein a combined thickness of said outermost layer and said topcoat is generally equal to approximately a quarterwave optical thickness at visible wavelengths.

* * * * *